United States Patent [19]

Dastrup et al.

[11] 4,048,825
[45] Sept. 20, 1977

[54] COIL RE-BAR STRAIGHTENER AND CUTTER

[76] Inventors: John Burke Dastrup, 5556 Thunderbird Lane, La Jolla, Calif. 92037; Paul Oscar Green, 5908 Camber Drive, San Diego, Calif. 92117

[21] Appl. No.: 644,554

[22] Filed: Dec. 29, 1975

[51] Int. Cl.[2] ............................................. B21D 3/04
[52] U.S. Cl. ........................................ 72/12; 72/17; 72/183; 242/75.43; 72/129
[58] Field of Search ................... 72/183, 160, 129, 17, 72/12, 33, 131; 242/75.43, 75.51

[56] References Cited

U.S. PATENT DOCUMENTS

| | | | |
|---|---|---|---|
| 458,780 | 9/1891 | Stiles | 72/131 |
| 2,895,532 | 7/1959 | Gettig | 72/183 X |
| 3,162,394 | 12/1964 | Culpepper et al. | 242/78.6 |
| 3,199,391 | 8/1965 | Haner et al. | 83/69 X |
| 3,559,431 | 2/1971 | Noe et al. | 72/8 |

*Primary Examiner*—Milton S. Mehr
*Attorney, Agent, or Firm*—Fulwider, Patton, Rieber, Lee & Utecht

[57] ABSTRACT

There is disclosed a machine for the cutting of reinforcing bar which is received in coils into straight lengths. The machine includes a coil unwinding station with an independent drive means for unwinding of the coil of reinforcing bar which is controlled in response to the slack in the re-bar unwound from the coil and in response to the lengths of re-bar cut by the machine to compensate for the large mass and inertia of the coil, interfacing the coil unwinding to the remainder of the machine operation. The unwinding station includes a slack detector responsive to the uncoiled angle of the re-bar to actuate, through roller cams, switches which control the drive for the coil spindle between power-on and power-off with braking or no braking operations. The re-bar is passed to straightener stations which are provided with a plurality of opposed rollers in orthogonal planes which are fixedly adjustable to bend the re-bar past its yield point in a direction opposite to the incident bends of the re-bar as it is received from the unwinding station. The re-bar is forced through the straightener stations by first and second drive stations that are positioned before the first straightener and after the second straightener stations. The machine also has a re-bar length detector which includes an endless belt movement displacement sensor that is mechanically coupled to an encoder that displays and records the forward movement of the re-bar. The machine terminates with a re-bar shear station having a fixed position anvil and a reciprocating hammer that has an aperture which receives the re-bar and that is driven in a reciprocal fashion to force the re-bar against the anvil, shearing the bar at any desired length. The machine is provided with suitable automatic and manual control means for dispensing any desired lengths of straightened re-bar.

27 Claims, 28 Drawing Figures

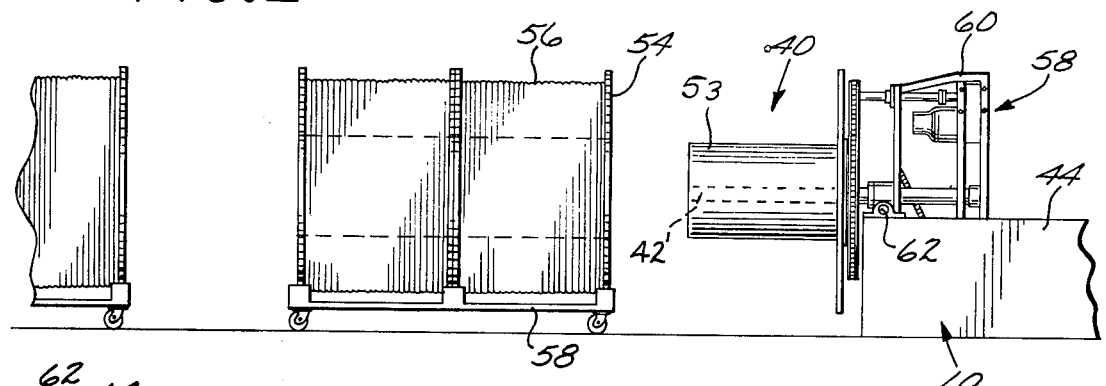
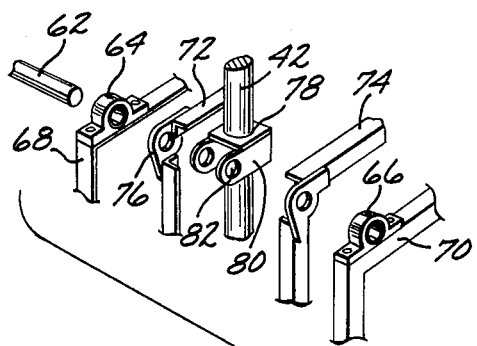
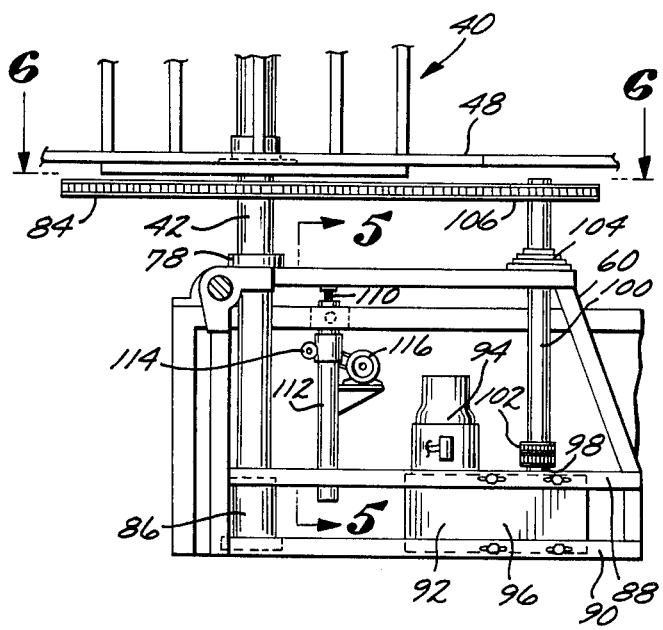
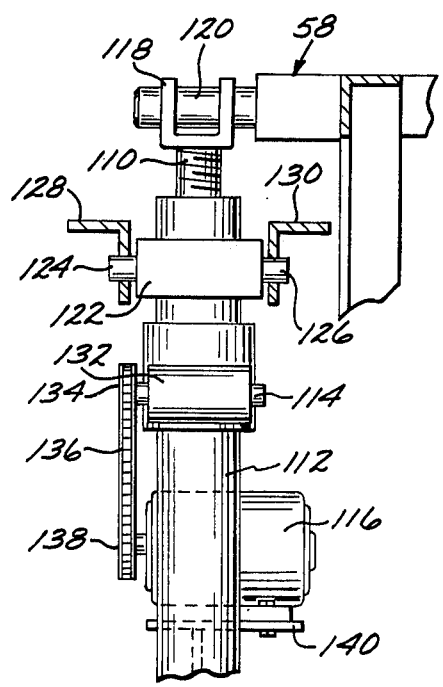
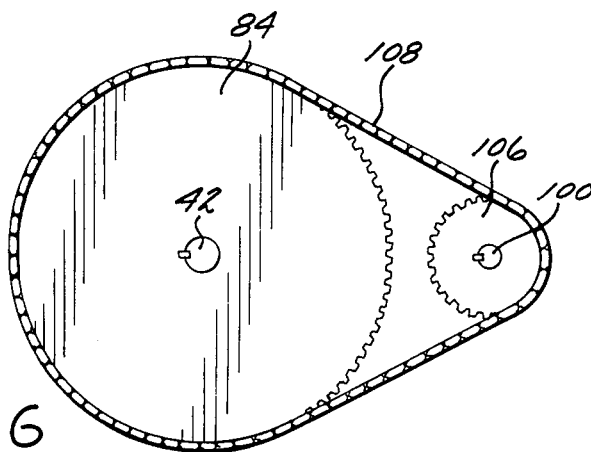

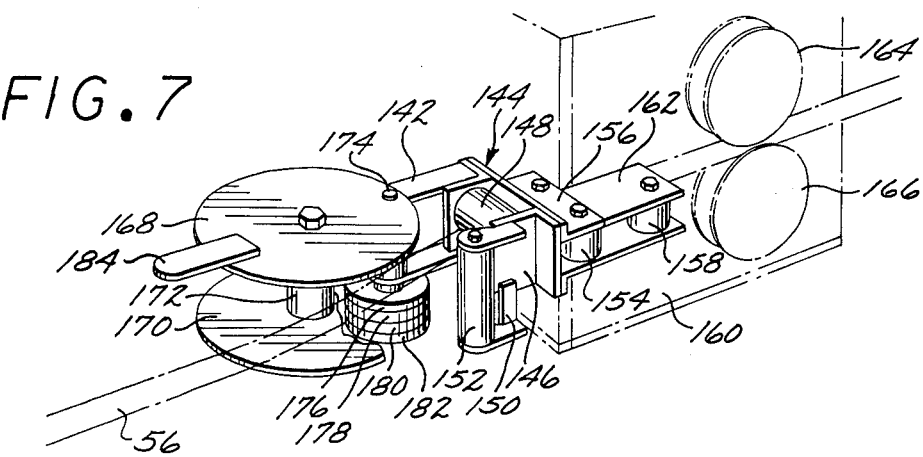
FIG. 7
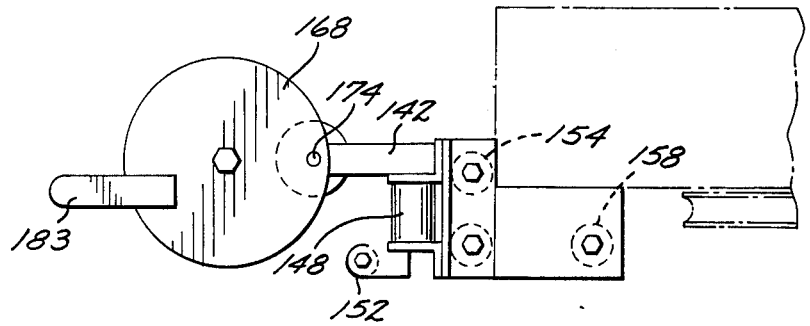
FIG. 8
FIG. 10
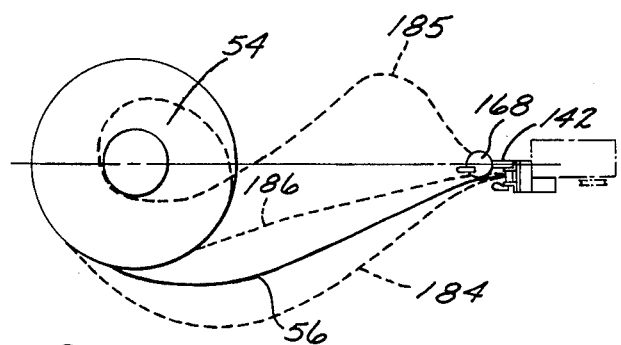
FIG. 9
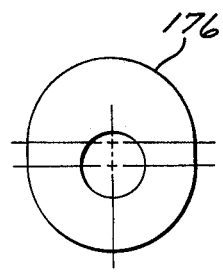
FIG. 11
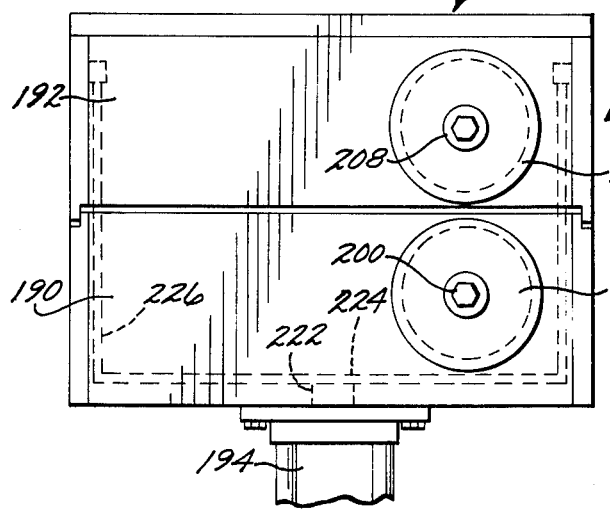
FIG. 12
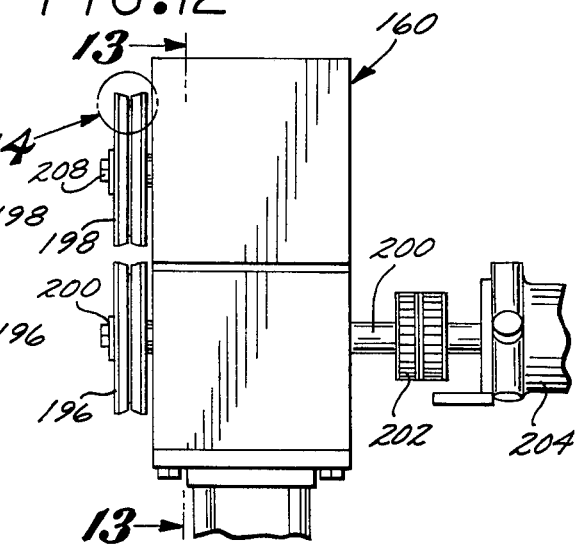

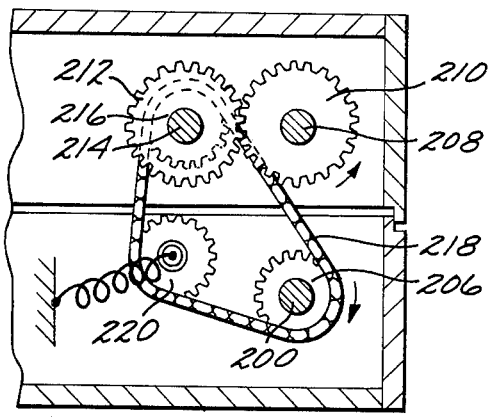
FIG. 13
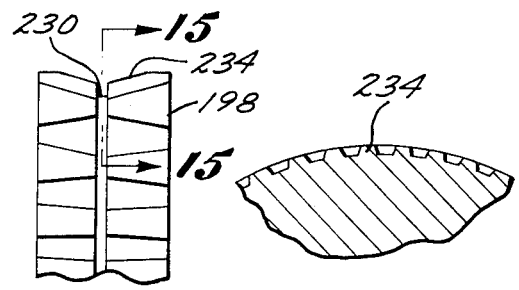
FIG. 14   FIG. 15
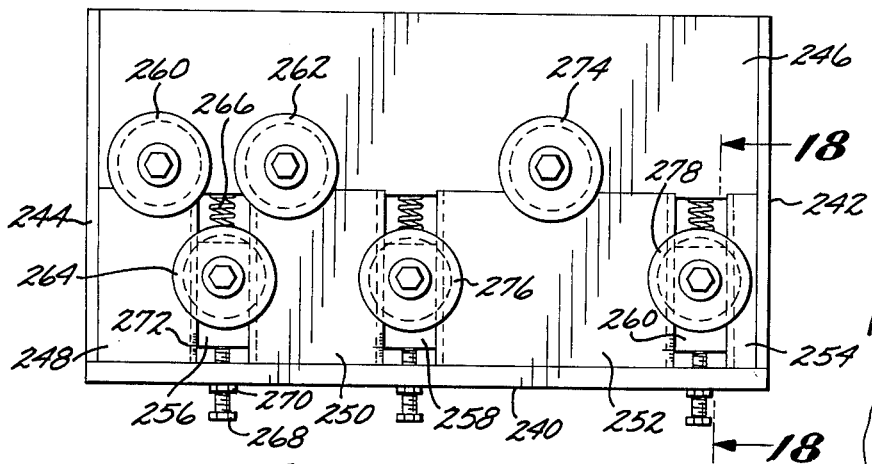
FIG. 16
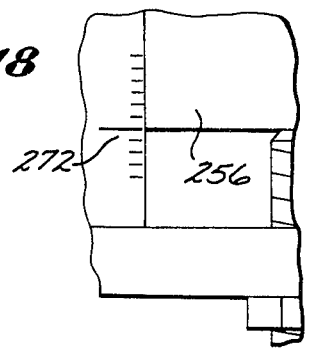
FIG. 17
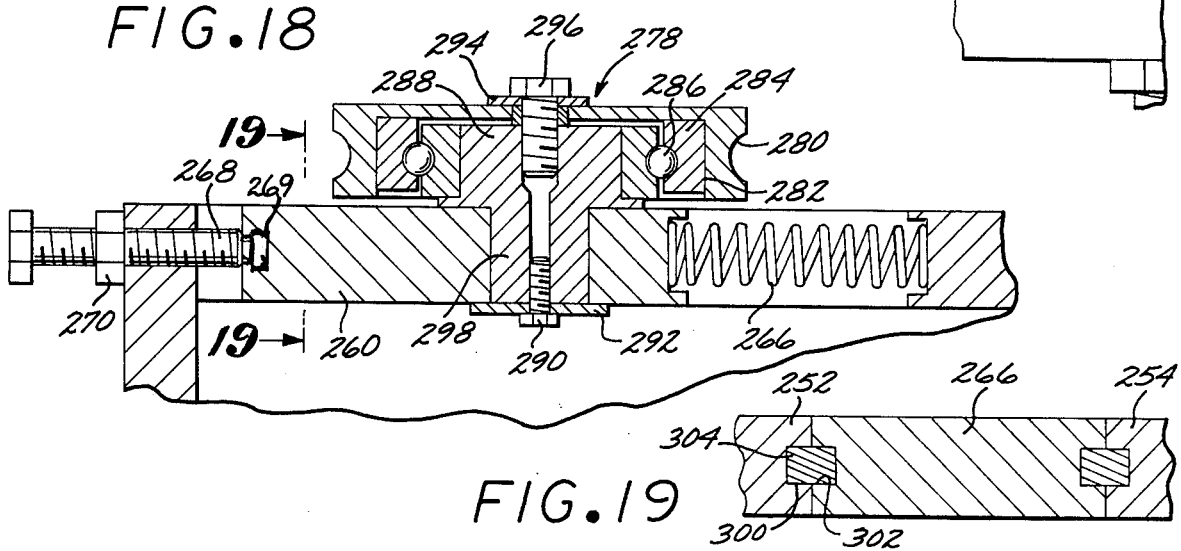
FIG. 18
FIG. 19

COIL RE-BAR STRAIGHTENER AND CUTTER

BACKGROUND OF THE INVENTION

1. Field of the Invention

This invention relates to dispensing precut lengths of straight steel rods received from coils of the rod and, in particular, to dispensing straight lengths of reinforcing steel used in the construction industry.

2. Brief Description of the Prior Art

The reinforcing steel rods (re-bar) employed in this country have typically been formed and shipped from the steel mills in straight lengths approximately 60 feet in length. These straight lengths are processed in standard cutting machines to prepare predetermined lengths suitable for their intended constructional use, often resulting in waste of the cut off ends. The practice in European countries, because of the limitation of their streets and high-ways, has been to produce the re-bar in coils approximately 4 to 5 feet in diameter and weighing approximately ½ to 1 ton. The re-bar is wound on spindles at the steel mill as the rods are processed and slowly cooled on the spindle, resulting in a variable annealing of the rod, dependent upon its position in the coil of steel.

A number of elaborate machines have been devised for receiving the coils of re-bar and processing the rod into straight lengths of predetermined sizes. Typically, the processing has used sets of opposed rollers which are all independently adjustable and which are employed in a stepwise fashion to progressively straighten the rod as it is passed through the machine. The controls on the pinch rollers and the operation of the machines follows an art requiring a high degree of skill and patience by the operator and requiring constant adjustment as the coil is processed to compensate for the differently annealed portions of the steel. Typically, the best machines presently can process the re-bar at quite low speeds.

BRIEF STATEMENT OF THE INVENTION

This invention comprises a machine for the high speed processing of coils of reinforcing rod (re-bar) into straight lengths of predetermined sizes. The machine includes a coil unwinding station provided with an independently driven and controlled drive spindle and includes, as a portion of the control for the drive spindle, a slack detector that is responsive to the incident angle of the re-bar delivered to the straightening and cutting stations of the machine. The drive spindle is controllable between power-on and power-off operational modes, the latter operational mode being further controllable between brake-on and brake-off modes of operation. The unwound re-bar is delivered to a first drive station, to a first straightener station, to a re-bar length detector station, a second straightener station that is oriented in a plane orthogonal to that of the first straightener station, a second drive station and a shear station, all in succession as the re-bar passes through the machine. The first and second drive stations are driven by separate hydraulic motors receiving hydraulic fluid in series from a constant power supply. The hydraulic motors receive pressured hydraulic fluid from a hydraulic pump operating at a constant power output whereby the velocity of the re-bar through the straightener station varies inversely with the power requirement for straightening of the re-bar. The hydraulic fluid is supplied to the drive motors by control valves which control the motors between stop and start modes, a reverse and four forward speeds.

The first and second straightener stations comprise straightener means which are mounted in orthogonal planes. Typically, the re-bar is supported with the coil in a horizontal position and the first straightener station is in the horizontal plane. The straightener means at each station comprises two sets of opposing rollers. The forwardmost set of rollers comprises a pair of fixed position, in-line rollers secured to the supporting frame. The set also includes a third, fixedly adjustable roller carried on a plate slidably mounted on the support frame with means for fixedly adjusting the position of the third roller along a path equidistant to the axes of each of the pair of rollers. The rollers of the first set in each plane are closely spaced and are adjusted to reverse bend the re-bar past its yield point, imparting a slight permanent reverse bend to the re-bar which is removed by the trailing set of rollers which are located at greater interaxis spacing. The trailing set of rollers of each straightener means has a single fixed position roller and a pair of in-line fixedly adjustable rollers carried on a two slides whereby the interaxis spacing between the fixed position and the pair of fixedly adjustable position rollers can be adjusted.

The machine also includes a re-bar length sensing device that includes a roller and an opposed endless track that passes over a pair of rollers which are resiliently biased against the single roller whereby the track is retained in positive engagement with the re-bar as the re-bar passes through the machine.

The machine terminates with a re-bar shear device that has a fixed position anvil and a slidably mounted hammer with an aperture for receiving the re-bar and with motive means including a lever with a fixed position fulcrum and hydraulic power means for actuating the lever to reciprocate the hammer past the anvil means, shearing the re-bar at the desired length.

BRIEF DESCRIPTION OF THE DRAWINGS

The preferred embodiment of the invention is illustrated in the figures of which:

FIG. 2 illustrates the coil loading operation at the coil unwinding station;

FIGS. 3–6 illustrate the constructional details of the coil unwinding station;

FIGS. 7–10 illustrate the construction and operation of the slack detector that develops control signals for the mode of operation of the coil unwinding station;

FIGS. 11–15 illustrate the re-bar drive means of the invention;

FIGS. 16–19 illustrate the straightening means employed at the first and second straightening station;

DESCRIPTION OF PREFERRED EMBODIMENTS

Figure 1:
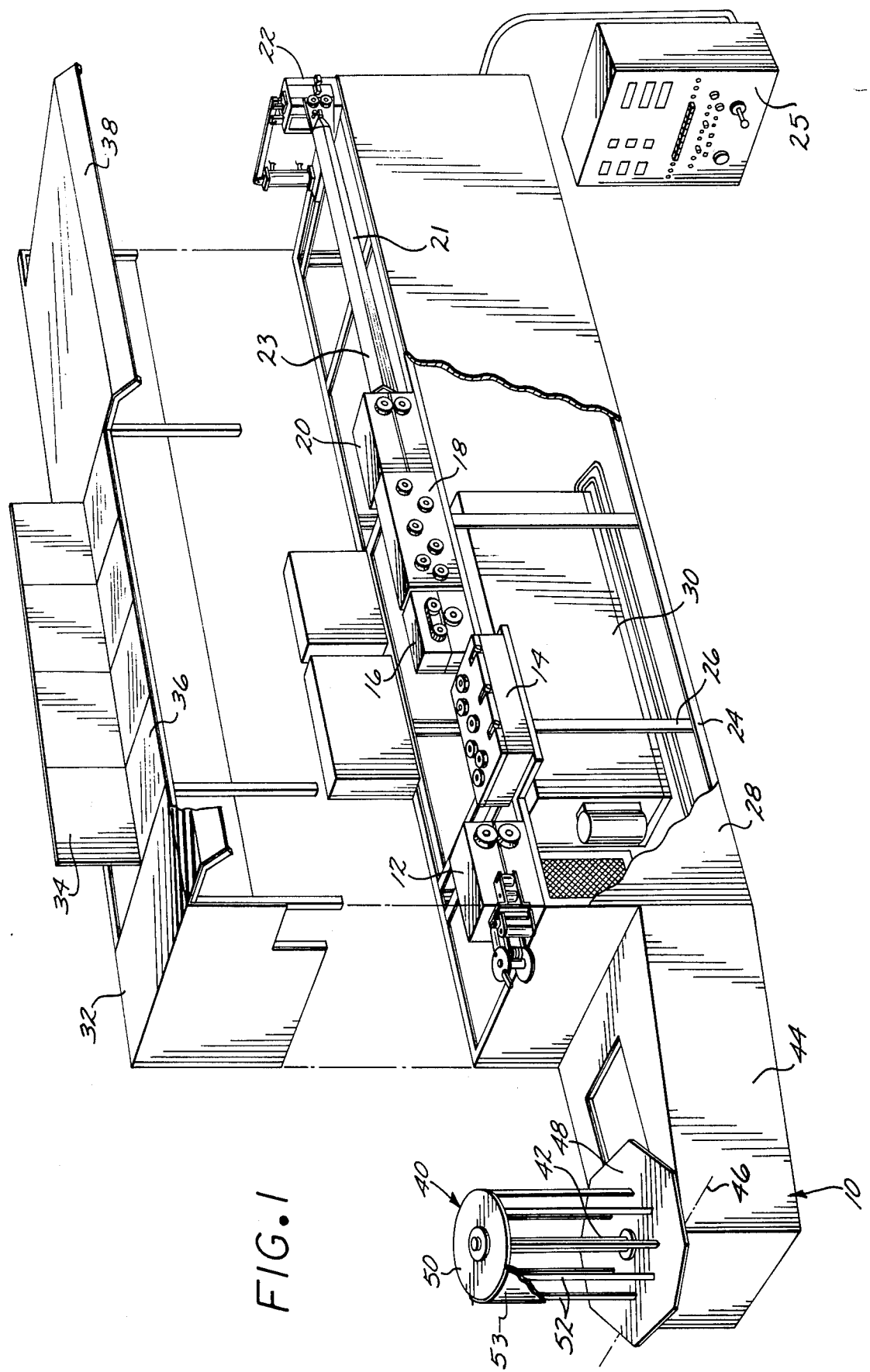
FIG. 1 is an isometric view of the machine.

Referring now to FIG. 1, the machine of the invention is shown as comprising a coil unwinding station 10, a first re-bar drive station 12, a first re-bar straightening station 14, a re-bar length detector station 16, a second re-bar straightening station 18, a second re-bar drive station 20 and a re-bar shear station 22. The re-bar guides through the machine can be covered by plate 21 which can have a top cover 23 hinged thereto to provide access to the re-bar. A central control console 25 can also be provided. The various operative means located at each of the aforedescribed stations are mounted on a generally boxlike frame defined by longitudinal frame members 24 and vertical frame members 26. The entire machine can be covered with sheet material 28, as illustrated, and the power means for the machine can be housed within the machine as generally indicated by enclosed chamber 30. The entire machine is covered by extension of the vertical frame members and an overlying layer 32 of sheet material. For illustrated purposes, the upper portion of the covering and supporting frame members are shown in exploded assembly. The top cover plate 32 can be provided with a series of hinged panels such as 34 and 36 to provide access to the internals of the machine and the front portion of the machine is opened for exposure to the controls. Preferably, this open portion is covered by a canope 38 which is an extension of the top cover sheet 32.

The unloading station is provided with a spindle 40 which is illustrated in upright position as would be occupied during the coil unwinding operation in the normal use of the machine. The spindle 40 is rotatably mounted on a drive shaft 42 which is mechanically connected to a suitable motive means that is included within the enclosed housing 44 that extends from the fore end of the machine. The spindle 42 is also pivotally secured on the frame for movement about an axis generally indicated by the broken line 46 to facilitate the loading and unloading of the coils of re-bar on the spindle assembly. The spindle 40 comprises an assembly of a backing plate 48 and a circular disk 50 of a diameter to be received within the spool of a conventional re-bar coil. The disk 50 and backing plate 48 are held in spaced-apart position by a plurality of longerons 52 which can be covered by sheet material 53.

Referring now to FIG. 2, the unwinding station 10 is shown with the drive spindle 40 in its horizontal position for receiving a coil 54 of re-bar 56. In the preferred embodiment, the coils 54 of re-bar can be carried on a suitable wheeled means such as a miner's cart 58 and the like which support the re-bar at a horizontal position which is coaxial with the horizontal position of shaft 42 of spindle 40. In this manner the re-bar coil 54 can be easily mounted onto spindle 40 and the spindle assembly can be moved into its vertical, re-bar unwinding position. The entire loading operation can be automated, if desired.

As shown in FIG. 2, the assembly of spindle 40 and the drive means therefor, generally indicated at 58, are mounted on a common frame 60 that is pivotally carried by shaft 62 on the main frame of housing 44, thereby permitting the pivotal movement of spindle 40 between its horizontal and vertical positions. The pivotal mounting of the spindle 40 and drive means 58 is shown in greater detail in FIG. 4 where the shaft 62 is shown as extending between spaced-apart pillow blocks 64 and 66 that are carried at opposite fore corners of the machine frame 68 and 70 which define the housing 44. The support frame 60 for the drive means of the spindle includes opposite frame members 72 and 74 which are also pivotally carried on shaft 62 by hinge plates 76. The spindle shaft 42 is mounted in a bearing 78 that is received within bearing box 80 having side extensions 82 that are apertured to provide clevis means for engaging of shaft 62.

Referring now to FIG. 3, the spindle means 40 is shown in its upright, coil unwinding position. As there illustrated, shaft 42 extends beneath backing plate 48 which supports the coil 54 of re-bar. The shaft 42 bears a fixed, driven sprocket gear 84 and is journalled in the bearing 78 with its end received within suitable thrust bearing means 86. The frame 60 of the drive means is a generally box frame with parallel lower frame members 88 and 90 for supporting the unwinding motive power means 92 of the machine. The motive power means can be an electrical or hydraulically actuated motor 94 with suitable gear reduction means located within gear box 96 and having a power output shaft 98. Shaft 98 is linked to stub shaft 100 by suitable universal means 102. Shaft 100 is journalled in bearing means 104 and is provided with drive sprocket 106 coplanar with sprocket 84. These sprockets and the interconnecting sprocket chain 108 are shown in plan view in FIG. 6.

The spindle 40 and associated drive means 58 are also provided with suitable actuation means whereby the spindle 40 can be pivoted between its vertical and horizontal positions. The actuation means generally comprises a lead screw 110 having its outboard end secured to the box frame 58 and received within a protective sleeve 112. The lead screw is rotatably driven by a worm gear 114 that is in driven interconnection to actuator prime mover 116. These elements are shown in greater detail in FIG. 5 where the lead screw 110 is illustrated in connection to the frame 58 by clevis means 118 that engages a cross bar 120 which extends between the longitudinal frame members of frame 58. The lead screw 110 is received within a sleeve 112 which depends from block 122 having stub shafts 124 and 126 which extend into pivotal engagement with supporting apertures in longitudinal members 128 and 130 which are stationary longitudinal members of the main frame of the machine. The worm gear mechanism 114 is generally contained within cylindrical housing 132 and is connected to a driven sprocket 134 linked by sprocket chain 136 to the drive sprocket 138 of prime mover 116. The prime mover 116 is mounted on a support platform 140 that is dependent from the sleeve 112.

The coil unwinding mechanism is provided with a detection system for determining the incident angle of the re-bar as it is processed into the first drive station. The incident angle of the cable at this location is indicative of the amount of slack between the unwinding station 10 and the first drive station 12. The detection means employed in the invention is shown in a perspective view in FIG. 7 and generally comprises an arm member, the assembly of circular disks 168 and 170 that is pivotally carried about shaft 174 by a bracket 142 which is mounted onto bracket assembly 144 that is fixedly mounted on the machine; in the illustrated embodiment being mounted on the housing for the first station drive mechanism. Bracket assembly 144 also includes a pair of angle brackets 146 that form a channel in which is mounted a horizontal roller 148. The bracket 146 also is secured to an attachment bracket 150 for mounting of the assembly to the lower half 160 of the housing for the drive mechanism of the first drive station. A vertical guide roller 152 is also carried by bracket 146. The rear portion of bracket assembly 144 bears a plurality of rollers which are disposed as a pair of rollers 154 carried by a transverse bracket plate 156 and an aft position roller 158 that is supported by longitudinal plate 162. These rollers are effective in guiding the re-bar shown in broken lines 56 into the drive rollers 164 and 166 of the first drive module.

The arm assembly of disks 168 and 170 is pivotally carried by the bracket 142, which extends forwardly, and is biased by resilient means, located beneath the disk 170 and not shown, to bear against re-bar 56 as it passes through the slack detector mechanism. The disks 168 and 170 also serve to restrain the re-bar from passing outside of the re-bar follower, roller 172, which extends between circular disks 168 and 170. Disks are the preferred shape for the arm member; however, any other shape of a protective guide plate could be used. There are provided on shaft 174 a plurality of cams 176, 178, 180 and 182 which are secured by suitable lock means, not shown, to shaft 174. The lock means are disengageable to permit the fixed adjustability of the angular orientation of these cams on shaft 172. The cams are located below circular disk 170 and are thus separated from contact with the re-bar 56.

The slack detector assembly is shown in plan view in FIG. 8 where the top disk 168 can be seen to support a projecting tab 183 which provides a handle for grasping the assembly and moving the assembly against the bias of its spring means, lifting the guide arm assembly and associated follower roller 172 from contact with the re-bar 56.

FIG. 9 illustrates a typical cam surface for the cams 176, 178, 180 and 182. These cams are operative upon pivoting of the arm assembly and shaft 174 about the centerline of the latter to actuate cooperative cam followers that are carried on the arms of micro switches and the like whereby the various operational modes of the spindle drive motor 94 and/or spindle braking means can be actuated.

Referring now to FIG. 10, the operation of the slack detector will be described. As there illustrated, a coil 54 of re-bar 56 is shown as the cable is normally uncoiled and passes into the slack detector mechanism. As illustrated, the slack detector arm is at a normal position with its guide roller riding on the re-bar. In the event that the coil 54 unwinds to an excessive degree, re-bar 56 will be displaced to the position shown by broken line 184, resulting in rotation of the arm assembly in a counter-clockwise direction from that shown in the figure and rotation of a new surface of the cams into contact with their respective cam followers. Similarly, if the coil 54 is unwound to an insufficient amount, the tension on the cable increases and the cable moves from its naturally bowed position shown at 56 to the position shown by broken line 186. This pivots the arm assembly of the slack detector in a clockwise direction and moves a different surface of the cams into contact with their respective cam followers. If the re-bar is not in the machine, the arm assembly pivots counter-clockwise and rotates a surface of the cams to actuate a microswitch to place the machine in a hold mode. Occasionally a re-bar will pull through a coil and assume the shape shown by broken line 185. When this occurs, the arm assembly moves clockwise to an extreme position to rotate a surface of the cams which actuates a cooperative microswitch to place the machine in a hold mode.

Referring now to FIGS. 11-15, the drive modules which are employed at the first drive station 12 and second drive station 20 will be described. Each drive module bears a pair of driven, opposed drive rollers with means to fixedly adjust the spacing between the rollers. Each module is contained within a housing 160 formed of a lower, fixed position half 190 and an upper, vertically adjustable half 192. The lower half is illustrated as secured to a pedestal 194 which is fixedly carried by the machine frame. The drive module has a pair of opposed drive wheels 196 and 198 which are each in driven mechanical interconnection to shaft 200 that is coupled through a flexible coupling 202 to hydraulic motor 204, the latter being fixedly mounted on the drive module frame.

The shaft 200 extends into the lower half 190 of housing 160 and bears a drive sprocket 206 pinned thereto. The shaft 200 continues through the housing and extends outwardly therefrom for the fixed support of the lowermost drive wheel 196. The upper drive wheel 198 is carried on a subshaft 208 that extends interiorly of the upper half 192 of housing 160. The inboard end of shaft 208 bears a driven gear 210 that meshes with a driving gear 212 which is on a common shaft 214 with a sprocket 216. Sprockets 206 and 216 are interconnected by chain 218 which also passes over a resiliently biased idler sprocket 220 which maintains the correct tension on chain 218.

As previously mentioned, the upper half of housing 160 is vertically adjustable. This permits the fixed adjustment of the interaxis spacing between drive wheels 196 and 198 to accommodate for varied diameters and loading of re-bar. The vertical displacement of the upper half 192 of housing 160 is effected by the vertical movement of shaft 222 that is slidably received within the supporting pedestal 194. Shaft 222 is secured to bracket 224 which has extension arms 226 that are secured to the inside walls of upper half 192 of housing 160 so that the vertical displacement of shaft 222 effects the vertical movement of the upper half 192 of the housing.

The drive wheels 196 and 198 are provided with serrated or toothed edges to improve the traction of the wheels on the re-bar surface. This is achieved by providing a center peripheral groove 230 and by cutting a plurality of equally spaced teeth 232 about the periphery of the wheel. Preferably the inside surface of each of the teeth is inclined at about 15 degrees as shown at 234 to increase the tendency of the re-bar to ride at the center of the drive wheels.

The re-bar straightener module which is employed at each of the first straightening station 14 and second straightening station 18 is shown in FIGS. 16-19. As there illustrated, the module is defined by a generally box-like construction having a front plate 240, side plates 242 and 244 and a fixed position top plate 246 which extends the length of the box frame but is approximately only half the width thereof. The other half of the top surface of the box frame is formed by plates 248, 250, 252 and 254 which are provided with edge grooves to define track means for the slidable mounting of slide plates 256, 258 and 260.

The fixed position cover plate 246 fixedly supports a pair of spaced apart rollers 260 and 262 which are in side-by-side array along the longitudinal direction of travel of the re-bar through the machine. The pair of rollers 260 and 262 together with roller 264 provide a first set of opposing rollers for straightening of the re-bar in the manner described hereinafter. The roller 264 is mounted on slide plate 256 which is slidably carried in the assembly on a path that is equidistant to each of the axis of rollers 260 and 262. Resilient means in the form of compression spring 266 is provided to bias roller 264 away from rollers 260 and 262, and suitable adjustment means such as screw 268 and associated lock nut 270 is provided whereby the spacing of roller 264 can be fixedly adjusted. The inboard end of screw 268 can also be retained in plate 256 to provide a positive withdrawal of the plate. Preferably, the assembly includes a scale 272 of indicia, shown more completely in FIG. 17, whereby the position of roller 264 can be observed and accurately set in repeated settings. The movable plate 256 can bear a suitable index marker cooperative with the scale 272 of indicia or, if desired, the edge of plate 256 can be directly observed in its position relative to the indicia of scale 272. The first set of rollers are closely spaced, e.g., rollers 260 and 262 are at about 6 inches spacing to insure adequate capability for working the re-bar.

The straightening module also includes a second pair of rollers which, preferably, includes a single fixed position roller 274 and a pair of cooperative, slidable rollers 276 and 278 that are carried, respectively, on slide plates 258 and 260. The construction of these rollers is similar to that described with regard to roller 264. Preferably, the second set of pinch rollers which includes rollers 274, 276 and 278, employs the rollers at greater spaced apart positions than those of the first set of rollers.

The construction of the rollers and slide plates is shown in greater detail in FIGS. 18 and 19. As shown in FIG. 18, each roller such as roller 278 has a peripheral V-groove or arcuate groove 280 that receives the re-bar 56. Each roller also bears a central recess 282 in which is mounted a ball bearing race 284 for retaining spherical bearings 286. The roller assembly is mounted on a bearing shaft 288 and retained in the assembly by a tie bolt 290 that extends through retaining washer 292, shaft 288, outer retaining washer 294 and nut 296.

The bearing shaft 288 has a cylindrical boss 298 that extends into an aperture in slide plate 260. The slide plate 260 is biased by compression spring 266 against the inboard end of screw 268 which, preferably, can be retained within groove 269.

FIG. 19 illustrates the sliding track engagement of plate 266 with the juxta-positioned, fixed position plates 252 and 254. As there illustrated, each of the plates bears a longitudinal groove 300 which, together, form a keyway 302 in which is mounted a key 304, thereby securing the movable plates in a slidably adjustable assembly.

Figure 20:
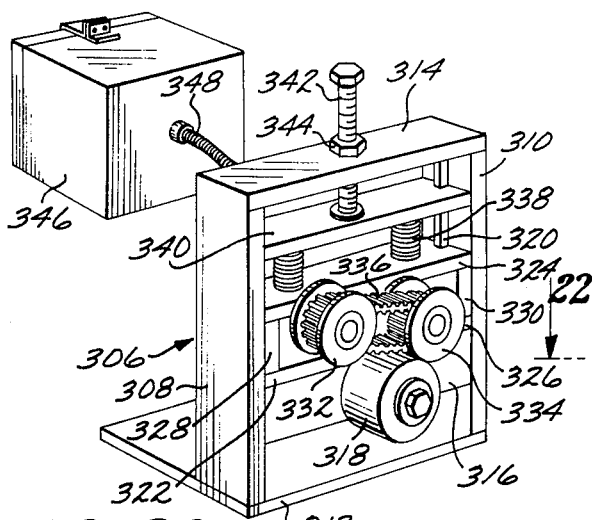
FIGS. 20–23 illustrate the re-bar displacement detector means.

The re-bar length detection means located at the displacement detection station 16 is generally indicated in the perspective view of FIG. 20. As there illustrated, the detection means 306 is mounted on a frame formed of vertical members 308 and 310 carried on a platform 312 and connected by transverse plate 314. A transverse plate 316 is fixedly secured between the upright members 310 and 308 and rotatably supports roller 318 that is supported on suitable bearings, not shown. Each of the upright frame members 308 and 310 bears a central rib such as 320 to define a sliding track means for the remaining assembly. The assembly thus receives a box frame 322 formed of upper transverse plate 324 and lower transverse plate 326 held in spaced apart position by end plates 328 and 330 which bear keyways for engagement with keys 320. The box frame 322 pivotally supports a pair of track rollers 332 and 334 over which is extended endless track means 336.

The box frame 322 and its dependent endless track assembly is resiliently biased towards the fixed position roller 318 by compression springs such as 338 which are carried between the upper plate 324 of the box frame 322 and a retainer plate 340 which is also slidably mounted on the tract guide 320 of the assembly. The position of retainer plate 340 is fixedly adjustable by means of screw 342 which is threadably carried in the upper frame member 314 and which can be fixedly secured by lock nut 344.

The remainder of the length detection means includes a suitable encoding device 346 which is coupled through a flexible shaft 348 to one of the shafts of endless track rollers 332 and 334 whereby the displacement of the endless track 336 is reflected by a proportional movement of the mechanism of the encoding device 346.

Figure 21:
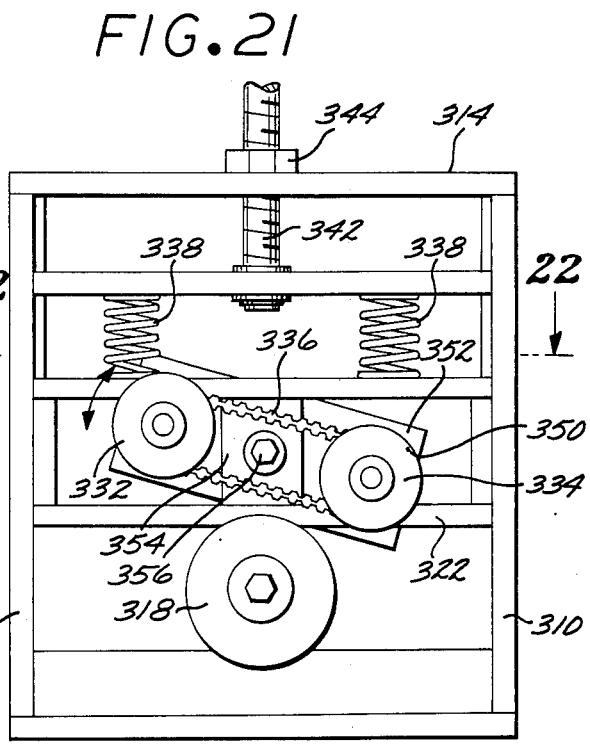
Figure 22:
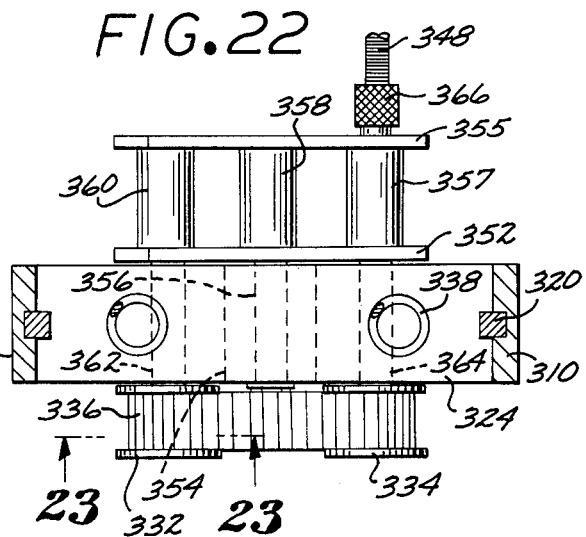

Referring now to FIG. 21, the mounting of the endless track assembly can be seen in greater detail. AS there illustrated, the endless track 336 is shown extending over the track rollers 332 and 334 which have outer disk flanges such as 350 for retaining the track on the rollers 332 and 334. The rollers are carried on a plate 352 which is pivotally mounted to a block 354 that is secured in the movable box frame 322 by shaft 356. The construction of this assembly is illustrated in greater detail with regard to FIG. 22 which is a view along lines 22 and 22 of FIG. 21. As there illustrated, the plate 352 can be seen to be the forward one of a pair of plates including plate 355 which are held in spaced-apart alignment by sleeves 357, 358 and 360. Each of the sleeves receives a shaft to provide the shafts 362 and 364 on which are mounted the track rollers 332 and 334 and the aforementioned shaft 356 which extends through the block 354 to provide the pivotal mounting of the endless track assembly. The flexible shaft 348 is shown in a mechanical coupling, e.g., by a splined interconnection, to shaft 364 and retained thereon by screw cap 366.

Figure 23:
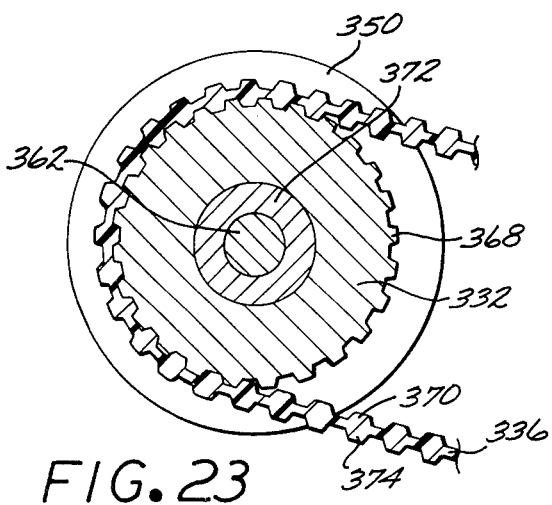

Referring now to FIG. 23, each of the rollers 336 and 334 are provided with a toothed periphery bearing a plurality of equally spaced teeth 368 which are engaged by cooperative transverse ridges 370 of endless belt 336. The wheel 332 shown in FIG. 23 is carried on its support shaft 362 by suitable bearing means 372 which can be a roller bearing or a lubricant impregnated bronze bearing sleeve and the like. The rollers are also supported between track retainer means in the form of disk flanges 350 which are mounted at each end of the roller to define a circular channel for receiving of endless track 336. The outer periphery of track 336 can be smooth or can bear a suitable tread for engagement with the re-bar. Accordingly, the outer peripheral surface can bear a plurality of transverse webs 374 that can be similar in shape and alignment to transverse ribs 370 carried on the inner peripheral surface of this track.

Figure 24:
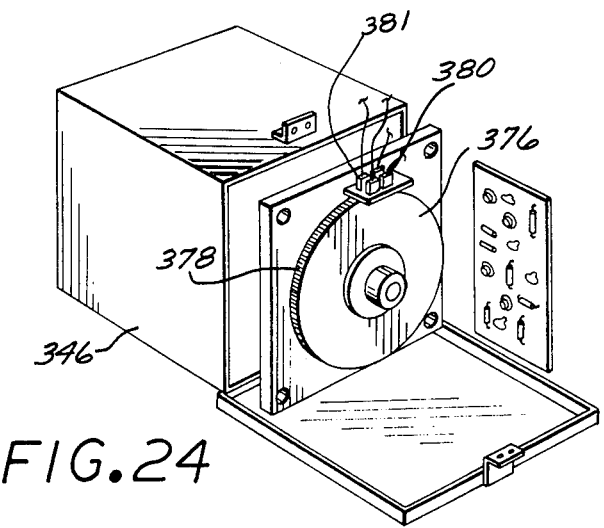
FIGS. 24 and 25 illustrate the displacement encoder means which respond to re-bar displacement registered by the displacement detector means.

Referring now to FIG. 24, the encoding device 346 carries means for generating an electrical signal that is proportional to the forward displacement of the re-bar through the machine. The mechanism for this purpose is shown in FIG. 24 as comprising a measuring disk 376 that is mounted on a shaft which is mechanically coupled to flexible shaft 348. The disk 376 bears peripheral means such as a plurality of closely and equally spaced teeth 378 which are cooperative with a pair of electro-optical transducers 380 and 381 for obtaining electrical signals that are proportional to the rotation of disk 376 in either direction. The transducers are shown in greater detail in FIG. 25 as each comprising a light source 382 cooperative with a phototransistor which receives the beam of light shown by broken line 386 that is interrupted by the teeth 378 on the periphery of disk 376 as the disk is rotated. The transducers are spaced apart by 90 degrees to impart rotational direction sensitivity to the device as described in greater detail hereinafter. The encoding device is thereby responsive to the direction of rotation of disk 376. In the event that the re-bar displacement through the machine occurs in a reverse direction, the encoding device is responsive to require that the ensuing forward movement of the re-bar must equal the prior reverse movement before counting of the encoding device again occurs.

The re-bar shear mechanism that is positioned at the cut-off station 22 of the device comprises a support base 390 on which is fixedly mounted anvil 392 having an anvil striking surface 394 that is provided with replaceable cutting block 396. The support plate 390 also bears an upright plate 398 and a spaced-apart vertical plate 400 which, together with anvil 392 support the upper transverse plate 402. The anvil 392 and vertical plate 398 bear longitudinal grooves 404 to provide track means for the movable hammer means generally indicated at 406. The hammer means 406 is a generally trapezoidal shaped plate 408 which has an aperture 410 to receive the re-bar and retain the re-bar in an anvil engaging position. The plate 408 also bears longitudinal grooves 404 on its opposite faces which grooves orient to those on anvil 392 and plate 398, thereby forming longitudinal keyways to receive keys, not shown, which retain the hammer in a sliding engagement in the assembly. The outboard edge of hammer means 406 also bears an auxiliary plate 416 on which are mounted opposed guide rollers 412 and 414 to direct the re-bar into aperture 410 in replaceable block 411. The block 411 retains and steadies the re-bar during the shear step. The fore end of auxiliary plate 416 bears re-bar guide means 418 and arm 420 that is pivotally mounted thereto and that supports a roller 422 in the path of the re-bar through the guide 418. The arm 420 is connected to the actuating lever of a switch mechanism in the control circuit of the machine to insure that the re-bar is in position in the cut-off station before the machine can be actuated at high speed.

The hammer means 408 is actuated by a suitable reciprocal drive means such as lever arm 424 that is pivotally mounted by pin 426 to a fulcrum support 428 carried on platform 402. The lever extends to a pinned connection to rod 430 that is mounted on the hammer means 408 by clevis 432. The opposite end of lever 424 is coupled to the piston rod 432 of a suitable hydraulic actuator 434 which is mounted on block 436 carried by base plate 390 such that the supply of hydraulic fluid to the actuator can effect reciprocal movement of hammer means 406 relative to the fixed anvil 392, shearing the re-bar at the desired lengths.

The dual drive modules for the machine achieve a significant improvement in performance over prior machines which have employed only a single re-bar drive unit. The two, serially powered drive units perform more smoothly in moving the re-bar through the machine. Additionally, the first drive station 14 provides powered threading of re-bar into the machine while the second drive station 20 provides a powered removal of re-bar from the machine.

Figure 27:
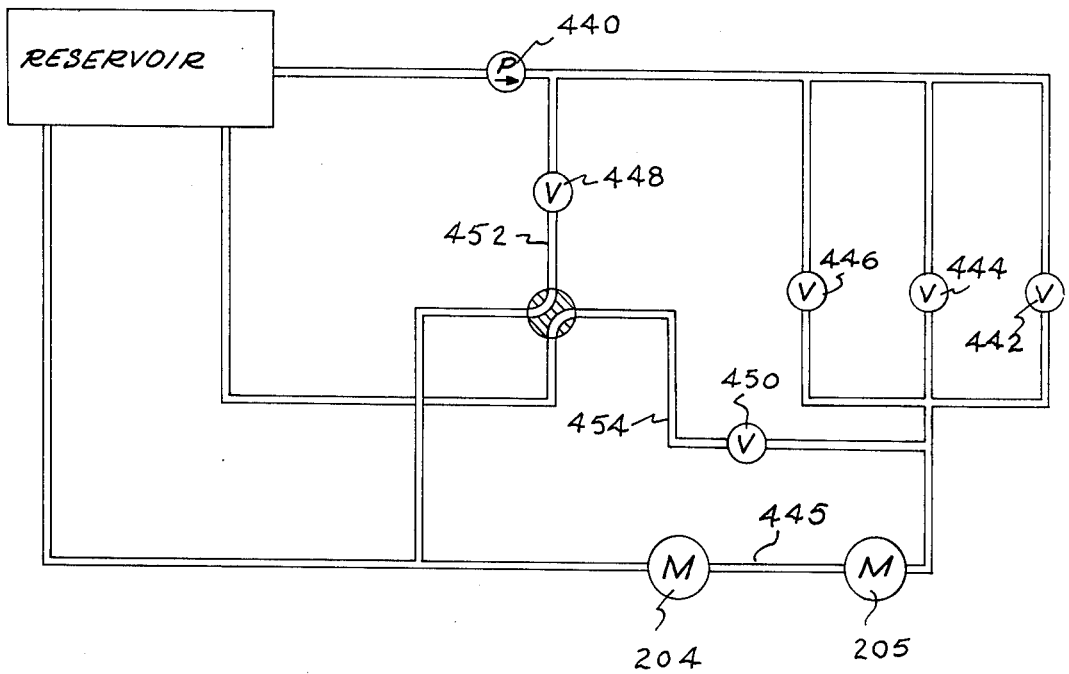
FIG. 27 illustrates a schematic of a hydraulic system useful in the invention.

The drive motors 204 and 205, as shown in FIG. 27, are serially connected by hydraulic line 445 to a common power supply, pump 440. The motors are, preferably operable in a plurality of speed modes, dependent on the supply of hydraulic fluid thereto. In the illustrated and preferred embodiment, four forward speeds are provided and these speeds are controlled by a plurality of hydraulic valves. The two slowest speeds can be controlled by the valve position of a single proportionating servo valve 442. The two highest speeds are controlled by positive acting on-off valves, 444 and 446, one for each speed mode. The serial connection of drive motors 204 and 205 through line 445 insures synchronism of operation.

Valve means are also provided for reversal rotation of motors 204 and 205. Any suitable reversing hydraulic control can be provided. A simplified illustration is shown by valves 447 and 450 which are located in by-pass lines 452 and 454. Opening of valves 448 and 450 can thus effect reversal of flow through the motors 204 and 205 for reverse re-bar movement.

The machine as thus described is capable of accurate, high speed operation to dispense cut lengths of re-bar of any desired dimension. The machine is adaptable for automated or semi-automated operation.

The re-bar is unwound from its coil and supplied to the machine by coil spindle drive means 92 and the mass and interia of the coil is interfaced with the high speed stop-start rhythm of the machine by the slack detector which, as previously described, actuates conventional relays for operation of the drive motor or spindle braking means to maintain a predetermined and optimum amount of slack in the unwound re-bar. The spindle drive motor is also in circuit with the control circuit which actuates the first and second drive motors 204 and 205, e.g., the control circuit to the hydraulic valves such as 442, 444, 446, 448 and 450, such that the spindle drive motor 94 is disengaged whenever the drive motors 204 and 205 are stopped. The spindle drive control circuit also includes a time delay to maintain the spindle drive motor on momentarily after stopping of drive motors 204 and 205. This time delay is preferably of controllable duration, e.g., a trimming capacitor or variable resistor of an RC circuit can be used which can be automatically or manually actuated whenever the high interia drag of the coil prevents the spindle drive from maintaining the desired slack. Typically, the need for this time delay is encountered only when processing the re-bar into short lengths.

The spindle brakes are also controlled in response to the slack detection means, as previously described. Preferably, the spindle brakes are deactivated whenever the machine is in its high speed operational modes, e.g., whenever drive motors 204 and 205 are controlled by valves 444 and 446.

The re-bar is processed through the machine in a discretely controlled stop-start fashion, with the drive motors 204 and 205 delivering the desired lengths of re-bar to the shear station 22. The re-bar lengths can be received by a suitable sorting and/or conveying means. The start-stop operation of the machine is readily adaptable to a re-bar bender such as described in U.S. Pat. No. 3,512,383.

The start-stop operation of the machine and the highly variable characteristics of the re-bar processed through the machine present a complex length control problem which is handled by the re-bar length detector and associated encoding mechanism. The machine is capable of processing re-bar of varied diameters, surface texture or pattern, and metal properties, the latter even varying within a single coil resulting from varied annealing as the coil is cooled. The effect of these variations is to deliver to the machine re-bar of irregular shape which is processed with continuous vibration or jitter having instantaneous incremental movement in forward or reverse direction.

The length detection means is designed to eliminate the detection errors that could be induced by the variable re-bar motion. The endless track spans a sufficient length of re-bar so that vibrational modes and jitter of the bar resulting from irregular shape and/or surface rib patterns do not disturb the track movement which is thereby responsive to travel of the re-bar through the machine.

Figure 28:
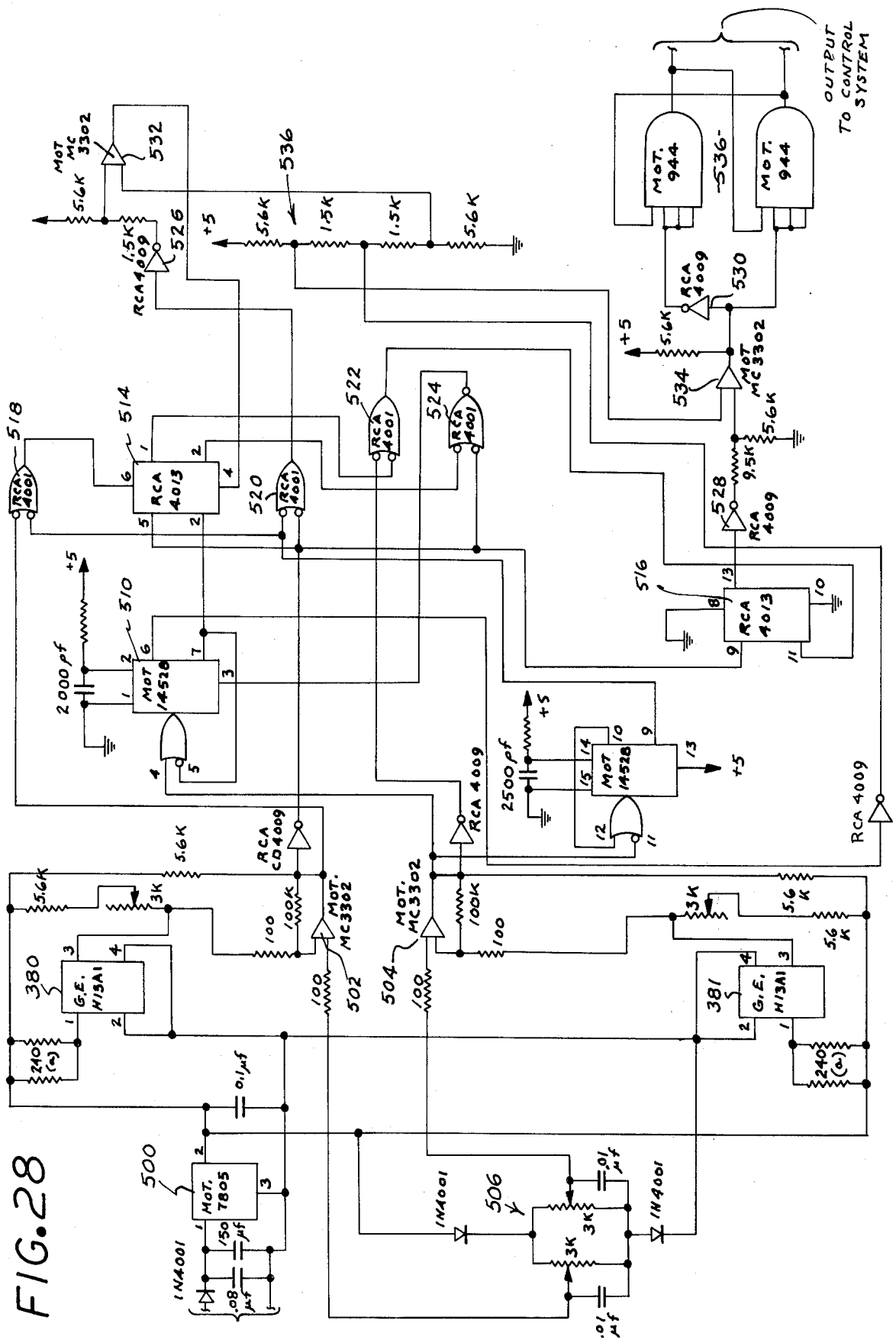
FIG. 28 is a schematic of an encoder circuit useful in the invention.

Referring to FIG. 28, the operation of the encoding device 346 may be described in greater detail. As briefly noted above, due to irregular shape of the re-bar itself and the recurrent velocity transitions of the bar as it travels through the machine, the instantaneous movement of the re-bar past the displacement detection station 16 is irregular and therefor, accurate measurement of the actual length which passes the measuring station is difficult and requires the above-described endless track 336 measuring device.

As described above, the linear motion of the endless track 336 is rotationally transmitted through flexible shaft 348 to the measuring disk 378 which has spaced teeth 378 which cooperate with electro-optical transducers 380 and 381 which are designed to digitally monitor incremental movement of the re-bar in a highly accurate manner.

As briefly discussed above, while the actual motion of the re-bar past the measuring station 26 is irregular, the desired output of the encoding device 346 is an accurate indication of actual incremental motion in a forward direction. To this end, the encoding device 346 monitors the instantaneous incremental motion of the re-bar in both the forward and reverse direction and, by digital signal processing techniques, generates an output signal indicating only actual incremental motion of a predetermined length in the forward direction which is coupled to the main control system to substantially reduce further signal processing time in the control system.

The logic circuitry of the encoding device 346 is shown in FIG. 28 and will be briefly operationally described. The electro-optical transducers 380, 381 are commercially available units designed for the described purpose and include light emitting diodes (LED) which provide the light source and phototransistors which are oriented to receive the light beam from the light emitting diodes.

Power for both the phototransistors and the light emitting diodes of the electro-optical transducers 380 and 381 as well as power for the remaining portions of the logic circuitry is obtained from a regulated power supply 500.

Figure 25:
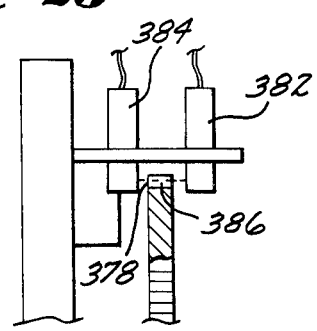
Figure 26:
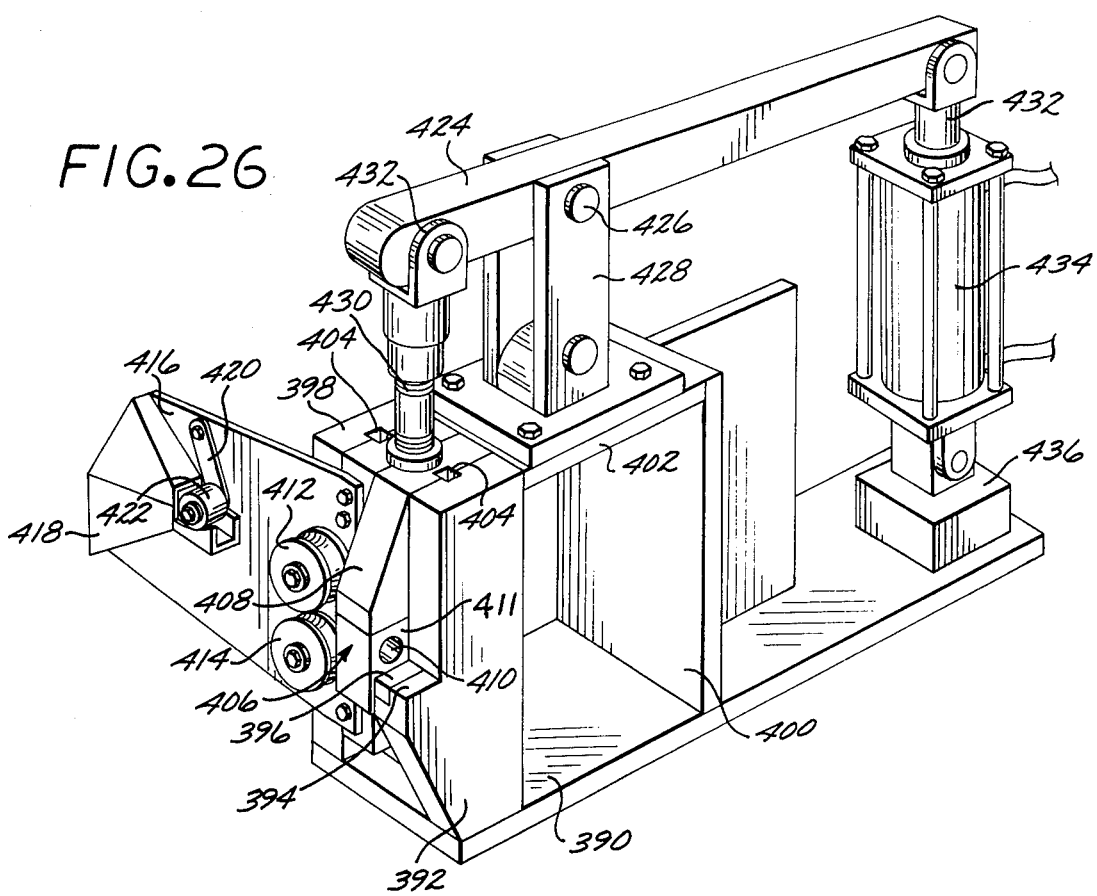
FIG. 26 illustrates the re-bar shear means of the invention.

The measuring disk 346 is positioned with the spaced teeth 378 oriented so as to interrupt the light beam from the light emitting diodes as illustrated in FIG. 25. The intermittent currents through the phototransistors in transducers 380 and 381 are connected as first inputs to comparators 502 and 504, respectively, and the second inputs to the comparators are reference voltages derived from a potentiometer network 506. The reference voltages are set so that the voltage transitions in the output of comparators 502 and 504 occur approximately midway between the transition portions of the teeth 378 of the measuring disk 376.

As noted above, the transducers 380 and 381 are oriented with respect to the measuring disk 376 so that the comparator 502 and 504 outputs are substantially 90 degrees out of phase with respect to each other. Thus, in accordance with conventional techniques, the time relationship between the outputs of comparators 502 and 504 are logically indicative of not only incremental motion of the disk 376 but also its direction.

As noted above, the desired signal output of the encoding device 346 is a signal indicative of actual forward incremental motion. Thus, the signal outputs of comparators 502 and 504 are logically processed through a logic network to monitor those signals and their sequence to logically determine when there has been a completed incremental forward movement. It should be noted that, due to the irregular motion of the re-bar at the detection station 16, that the outputs of the comparators 502 and 504 may occur in a plurality of sequences which indicate jitter or intermittant forward and reverse motion of a gear tooth edge past a single transducer resulting in rapidly reversing outputs of a single comparator and no output from the other, or reverse motions which result in an output from a comparator indicating a reverse motion. All of these conditions are monitored by the logic network which will produce an appropriate output signal only when the proper sequence of signals appears at the outputs of the comparators 502 and 504.

The logic network includes a pair of monostable multivibrators 510 and 512 which perform time delaying functions on signals while other sequences of events are monitored. The logic network also includes a pair of D-type flip-flops 514 and 516 which maintain signals indicating the completion of portions of the correct sequence of events. In addition, the logic network includes a number of NOT-OR gates 518, 520, 522 and 524 together with a plurality of inverters 526, 528 and 530 and a pair of comparators 532 and 534 which, together with a series resistor string 536, logically combine the event signals to determine the proper sequence which indicates a completed forward incremental movement.

When the proper sequence of signals occurs, a latch 536 comprised of a pair of cross-coupled AND gates generates an output signal which is coupled to the main control system for further use.

The invention has been described by reference to the illustrated and presently preferred embodiment. It is not intended that the invention by unduly limited by this disclosure of the preferred embodiment. Instead, it is intended that the invention be defined by the means, and their obvious equivalents, set forth in the following claims.

What is claimed is:

1. A machine having a coil unwinding station for a receiving and unwinding metal rod from the outer periphery of coils of metal rod, and rod driving and straightening stations remote from said coil unwinding station for straightening the unwound metal rod, and a rod cutting station for cutting of the rod to predetermined lengths and including, at said rod driving and straightening stations, the following rod slack detection means:

a rod follower pivotally mounted on said machine at the rod inlet to said driving and straightening stations;

resilient means biasing said rod follower against said rod entering said driving and straightening stations; and cam means driven by said rod follower and responsive to the incident angle of entrance of said rod processed from said unwinding station to said driving and straightening stations; and further including, at said coil unwinding station, the following:

spindle means for receiving the coil of metal rod;

support means for said spindle to permit said spindle free rotation thereon;

drive means for rotation of the spindle including prime mover means and brake means operatively connected to said spindle; and spindle rotation control means including a drive control circuit operatively connected to said prime mover means with switch means in circuit therewith and responsive to the movement of said cam means whereby said prime mover means is disengaged in response to excess slack in said unwound metal rod and is engaged in response to excess tension of said unwound metal rod, independently of the amount of unwound rod on said coil.

2. The machine of claim 1 wherein said control means also includes a brake control circuit operatively connected to said brake means and responsive to said movement of said cam means whereby said brake means is engaged when excess slack is detected in the unwound metal rod.

3. The machine of Claim 1 wherein the rod slack detection means includes at least a pair of opposed guide rollers for receiving the metal rod supported at said driving station on said machine by bracket means and including an arm pivotally mounted thereon, extending towards the coil of wound metal bar and bearing, on its outboard end, roller means, and resilient means biasing said roller means against said metal bar.

4. The machine of claim 3 wherein a cam rider and associated switch are provided for actuation in the drive control circuit and a separate cam, rider and switch are provided in the brake control circuit.

5. A machine having a coil unwinding station for receiving and unwinding coils of metal rod and rod driving and rod straightening stations remote from said coil unwinding station and including:

first rod drive means including a pair of opposed driven rollers;

a first rod straightening means including a plurality of opposed idler, pinch rollers mounted in a first plane in a straightening pattern of a pair of side-by-side rollers with an opposed roller equidistant from each of said pair of rollers and having peripheral grooves to receive said rod from said first drive means;

a second rod straightening means also including a plurality of opposed idler, pinch rollers, also mounted on said straightening pattern in a plane orthogonal to said first plane and also having peripheral grooves to receive rod from said first rod straightening means; and second rod drive means including a pair of opposed, driven rollers to receive rod from said second rod straightening means; and first and second hydraulic motor means operativel coupled, respectively, to said first and second rod drive means and serially connected to a common source of hydraulic power fluid for synchronous operation thereof.

6. The machine of claim 5 wherein said common source of hydraulic power fluid includes a hydraulic circuit having control valves to regulate the rotational speed of said hydraulic motors.

7. The machine of claim 5 wherein said first and second drive means each comprise:

a first frame fixedly secured to the machine;

a first drive roller of said pair of opposed drive rollers for engagement with said metal rod on a first shaft rotatably mounted on said first frame and bearing a first drive sprocket;

a second frame superimposed on said first frame;

support bracket means secured to said second frame and slidably mounted with respect to said first frame whereby said second frame can be moved relative thereto;

a second drive roller of said pair of opposed drive rollers mounted on a second shaft rotatably mounted in said second frame and bearing drive gear means;

second sprocket means carried by said second frame and in driving relationship to said drive gear means;

sprocket chain means extending about said first and second sprocket means with idler chain tension means whereby said first and second drive roller means are mechanically connected in a driven relationship; and prime mover means mechanically coupled to one of said first and second shafts for effecting rotation of said first and second drive rollers.

8. The machine of claim 7 wherein said first and second drive rollers are superimposed whereby controllable vertical displacement of said second frame effects variation in the interaxis spacing of said first and second drive rollers.

9. The machine of claim 8 wherein the rims of said first and second drive rollers have a toothed surface.

10. The machine of claim 9 wherein the rims of said first and second drive rollers bear a central peripheral groove.

11. The machine of claim 5 wherein each of said first and second rod straightening means includes a leading set of closely spaced opposed rollers and a trailing set of widely spaced opposed rollers, each set being disposed in said straightening pattern.

12. The machine of claim 11 wherein said leading set of opposed rollers comprise:

frame means for supporting said rollers including a first frame member fixedly secured to said machine with the pair of side-by-side rollers of the leading set of rollers fixedly mounted thereto; and movable plate means slidably carried on said support frame along a path equidistant to the axis of said pair of rollers and bearing said third roller of said first set thereon.

13. The machine of claim 12 wherein said frame means bears second and third movable plate means each of which rotatably support the rollers of the pair of side-by-side rollers of the trailing set of rollers and wherein said fixed frame member rotatably supports the third roller of said trailing set of rollers.

14. The machine of claim 12 including adjustment means for the fixed adjustment of said movable plate with indicia on at least one of said movable plate and frame to register the position of said movable plate.

15. The machine of claim 13 wherein independently adjustable adjustment means are provided for each of said first, second and third movable plates whereby the positions of said first, second and third movable plates along their paths of movement can be fixedly adjusted, and indicia on said frame or each of said movable plates whereby the positions of said movable plates is registered.

16. The machine of claim 13 including resilient means biasing said movable plates away from said fixed frame member.

17. The machine of claim 1 including rod length detection means mounted on said machine and in the path of travel of said rod therethrough and comprising:
   a first guide roller;
   a pair of endless track rollers;
   an endless track extending over said endless track rollers; and
   means biasing said endless track relative to said first guide roller.

18. The machine of claim 17 wherein said roller and endless track rollers are mounted on an assembly frame means secured to said machine.

19. The machine of claim 18 wherein said endless track support rollers are distally mounted on a support frame with means pivotally mounting said support frame to said assembly frame means.

20. The machine of claim 19 wherein said support frame is pivotally mounted on slide means received by track means carried on said assembly frame means.

21. The machine of claim 20 wherein said means biasing said endless track comprises compression spring means biased between said assembly frame means and said slide means.

22. The machine of claim 21 wherein said compression spring means bear against retainer plate means slidably carried in said frame assembly means with adjustment means to fixedly adjust the position of said retainer plate in said assembly frame means whereby the loading of said compression spring means can be fixedly adjusted.

23. The machine of claim 17 including a forward displacement encoding means comprising:
   measuring disc means connected to one of said track rollers for rotation therewith, said measuring disc having a plurality of peripheral measuring teeth;
   photo-transistor means for sensing passage of said teeth of said measuring disc, said photo transistor means being positioned to generate two substantially quadrature-phased signals during the passage of a tooth of said measuring disc means through a predetermined angular increment, the time sequence of occurrences of said quadrature-phased signals being indicative of the direction of rotation of said track rollers;
   comparator means for receiving said quadrature-phased signals and generating two substantially quadrature-phased and rectangularly shaped outputs;
   logic network means connected to receive said rectangularly shaped outputs for monitoring said time sequence of occurrence of said outputs to detect forward or reverse displacement and require that ensuing forward displacement must equal prior reverse displacement before counting to thereby generate a control signal only for incremental forward displacement.

24. The machine of claim 1 including the improvement in rod cutting means which comprises:
   a support frame;
   anvil means fixedly mounted on said support frame;
   hammer means slidably mounted in juxta-position to said anvil means;
   aperture means to receive said rod carried by one of said anvil and hammer means; and
   drive means to reciprocate said hammer means in a sliding motion past said anvil means whereby said metal rod carried in said aperture is sheared by said anvil means.

25. The machine of claim 24 wherein said anvil bears a replaceable cutting member adjacent said hammer means.

26. The machine of claim 24 wherein said drive means includes a lever pivotally mounted on a fixed fulcrum support carried by said support frame and pivotally secured at its opposite ends to said hammer means and to hydraulic actuator means.

27. The machine of claim 1 wherein said spindle support means are pivotally mounted on said machine to permit pivotal movement of said spindle between a horizontal position for receiving coils of metal rod and a vertical position for unwinding and dispensing metal rod therefrom;
   means securing said prime mover of said spindle drive means for rotation of said spindle to said spindle support means; and
   jack means and jack drive means for movement of said spindle support between said horizontal and vertical positions.

* * * * *